INFORMATION BEARER AND READING DEVICE THEREFOR

Filed Feb. 20, 1964 5 Sheets-Sheet 1

INVENTOR.
C. J. van DALEN
BY Hugh A. Kirk
ATT'Y.

INVENTOR.
C. J. van DALEN
BY Hugh A. Kirk
ATT'Y.

INVENTOR.
C. J. van DALEN
BY
Hugh A Kirk
ATT'Y.

INFORMATION BEARER AND READING DEVICE THEREFOR

Filed Feb. 20, 1964 5 Sheets-Sheet 4

INVENTOR.
C. J. van DALEN
BY
Hugh A. Kirk
ATT'Y.

INFORMATION BEARER AND READING DEVICE THEREFOR

Filed Feb. 20, 1964

INVENTOR.
C. J. van DALEN
BY Hugh A. Kirk
ATT'Y.

United States Patent Office 3,469,237
Patented Sept. 23, 1969

3,469,237
INFORMATION BEARER AND READING DEVICE THEREFOR

Christiaan Johannes van Dalen, Leidschendam, Netherlands, assignor to de Staat der Nederlanden, Ten Deze Vertegenwoordigd Door de Directeur-Generaal der Posterijen, Telegrafie en Telefonie, The Hague, Netherlands Filed Feb. 20, 1964, Ser. No. 346,252
Claims priority, application Netherlands, Feb. 22, 1963, 289,336
Int. Cl. G06k *9/00, 7/00*
U.S. Cl. 340—146.3 13 Claims

ABSTRACT OF THE DISCLOSURE

An information bearer provided with rows of characters including digits that can be read by vision or by machine and that consist of line sections lying in $n$ rows and $m$ columns, as code elements of a self-checking code and, of line sections lying between the columns, each connected at least to one of the first-mentioned sections of line and provided for visual reading and rejection by the machine reader. The reader for these characters comprises $m$ columns and more than $n$ rows of code element scanners to provide for vertical misalignment of the characters being scanned, which scanners are connected to A.C. amplifiers and storing triggers which respond only to abrupt transitions in the marks or lines. AND-gate means are connected to the scanner triggers for detecting a whole character by the presence of sections in its outer columns and rows of code elements. For stored information from characters out of vertical alignment, shifting means controlled by said detecting means are provided for shifting the stored information through the columns of scanner triggers until the information for that character is recorded in those triggers which are connected to the output or code converter for that information.

RELATED APPLICATIONS

Netherlands patent application Ser. No. 289,336 filed Feb. 22, 1963, from which this application claims priority.

BACKGROUND OF INVENTION

A prior information or registration bearer has been described in the copending U.S. patent application of Van Dalen et al. Ser. No. 234,745, filed Nov. 1, 1962, and assigned to the same assignee as the present application. In this case the specially selected cyclic rotatable coded characters consist of line sections lying in three rows and three volumns as code elements, and of line sections lying between the columns. A line section in a column has normally a ⅓ column's length, two or three united line sections have two or there times this length, respectively. These line sections are scanned e.g. by photocells. If a character has been placed a little too high or too low, it may happen that just a transition from line to blank passes one of the photocells, and due to the equal lengths of line sections and blanks and the corresponding location of the photocells, this may occur more than once in a column. In such an uncertain position the probability of a photocell recording a line section is 50%; so transpositions may occur, i.e. that in reading characters line sections and blanks may be transposed or shifted. Such a transposition is not detected in the self-check, since the lines-to-blanks ratio remains unchanged in the case of a transposition. Consequently, a wrong character is read without being perceived.

A reading device for such a registration bearer is also described in this copending Van Duuren et al. application Serial No. 234,745, now Patent No. 3,370,271. A difficulty with this device, however, is that the code elements must be allotted to the characters in such a way that in case of a cyclic transposition in the direction of the column, no signals can pass into each other.

In the copending Van Duuren U.S. patent application Serial No. 226,357, now Patent No. 3,351,906 filed Sept. 26, 1962, and also assigned to the same assignee as the present application, this difficulty is avoided because each line section is scanned by three photocells placed beside each other, and if different results are obtained, only the result obtained from a majority of at least two adjacent photocells will be accepted.

The results of a signal reading are only accepted, if for all the line sections this majority proceeds from adjacent photocells of corresponding locations. In that case, however, the number of registration bearers the reading device has to sort out as illegible, is rather large.

SUMMARY OF INVENTION

Now it is an object of the invention to provide a type of registration bearer and reader therefor which does not have to be cyclically rotatable and with which the above-mentioned errors in reading characters are avoided and the percentage of illegible registration bearers is reduced.

According to the invention this has been achieved by such an arrangement that the first-mentioned or machine read code sections of line per code element have a length differing systematically from $1/n$ of a column's length and that the remaining machine rejected and visually read sections of line are so located that, viewed in at least one of the horizontal directions, they do not add to or take away from one of the first-mentioned sections of line any transition contrasting with the background.

The reading device for such characters possesses a means for detecting the presence of whole characters containing line sections as code elements in a given pair of columns and in a given pair of rows such as the outside columns and rows, and, $m$ columns of scanners and more than $s \times n$ rows of scanners for $s$ sets of scanners per character, to allow for vertical misalignment of characters. The scanning results are recorded in the sets of triggers corresponding to the sets of scanners and the columns of these triggers are connected by a shift arrangement so that those of the set of scanners scanning the characters can be shifted, after the establishment of the presence of the above-mentioned sections of line, to the set of triggers, which is connected to a code converter.

BRIEF DESCRIPTION OF DRAWINGS

The above mentioned and other features, objects, and advantages, and the manner of attaining them are described more specifically below by reference to an embodiment of the invention shown in the accompanying drawing, wherein.

DETAILED DESCRIPTION OF PREFERRED EMBODIMENT

(A) The characters

Figure 1:
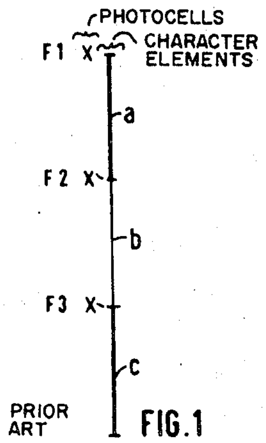
FIG. 1 schematically illustrates a shifted position of scanners with respect to a column of line sections or blanks of equal length according to the prior art.

In FIG. 1 two sections of line, *a* and *c*, separated by a blank *b*, have been filled in in a column that can be regarded as part of a character. The three sections are of equal lengths and are scanned by the photocells $F_1$, $F_2$ and $F_3$ represented by crosses *x*. The distances between the photocells are equal to the length of the sections of line. In the figures the sections of line pass the photocells too low, notably in such a way that just the transitions move past the photocells. Thus the probabilities of a photocell reading a line section (marking element) or a blank (spacing element) are equal. If use is made of a self-checking code exhibiting a fixed mark-to-space ratio, e.g. 2M–1S, an incorrect registration can be accepted yet without being perceived, since the ratio 2M–1S is also fulfilled in case S–M–M is read, generally in the case of a transposition, i.e. when a section of line is read as a blank and conversely.

Figure 2:
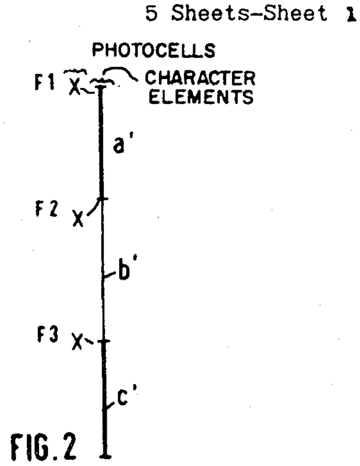
FIG. 2 schematically shows this shifted position as shown in FIG. 1 in the case of shortened sections of line according to one embodiment of the present invention.

To avoid the incorrect acceptance of a reading result the sections of line are given a length differing from ⅓ column's length. In FIG. 2 the sections of line *a'* and *c'* have a shorter length, notably so much shorter that only the photocells $F_1$ and $F_3$ find themselves opposite a transition; the photocell $F_2$ is no longer in an uncertain position, but faces the blank section *b'*. So this last-mentioned cell will record a space and as only a result is accepted if the column exhibits the ratio 2M–1S, it will no longer be possible that an incorrect registration is accepted without being perceived. As this is obtained with shortened sections of line *a'* and *c'* because in any case the blank sections *b'* must be scanned as such, it can also be obtained with lengthened sections of line because in any case these longer sections of line must then be scanned as such. In what follows a closer discription will be given of an embodiment of figures exhibiting shortened sections of line.

In the above it has been assumed that each section is scanned by means of one photocell. If e.g. three photocells are available for each section, in order to increase the tolerance in the direction of the columns, three sets of photocells are available for a character. Then the scanning results of each set of correspondingly located photocells may be tested per signal or character for their acceptability in the applied self-checking code according to applicant's copending U.S. patent specification Serial No. 72,666 filed Nov. 30, 1960. In this case the shortening or lengthening of the elements according to this invention is always advantageous as well, since it is conceivable that in such a case two different registration results will be obtained, both of which are accepted by the self-checking code. By introducing the said shortening or lengthening such an error can be avoided.

FIG. 3 illustrates the shaping of the figure "2" with shortened sections of line. It has been assumed that the desired figures are based on a self-checking code exhibiting a mark-space ratio of 4M–5S, the nine elements being arranged in three rows and three columns.

Figure 3A:
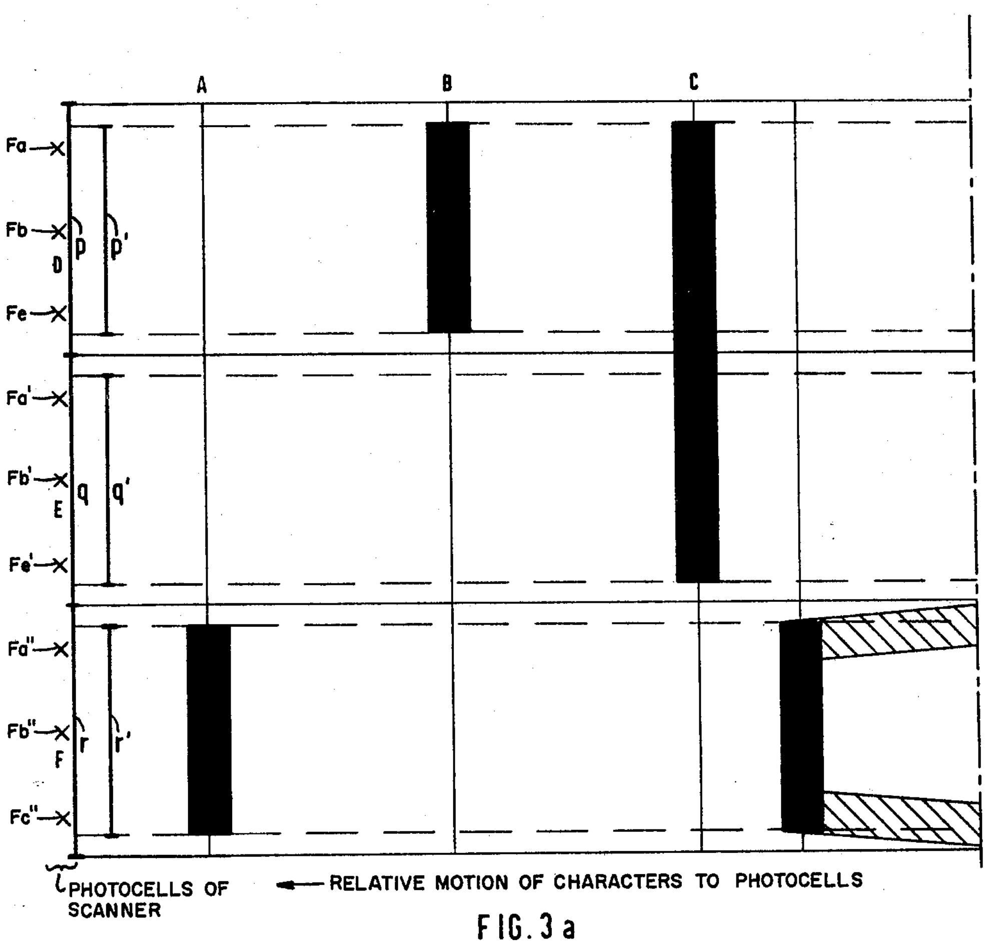
FIGS. 3*a* and 3*b* taken together illustrate the formation of the figure "2" according to the invention.
Figure 3B:
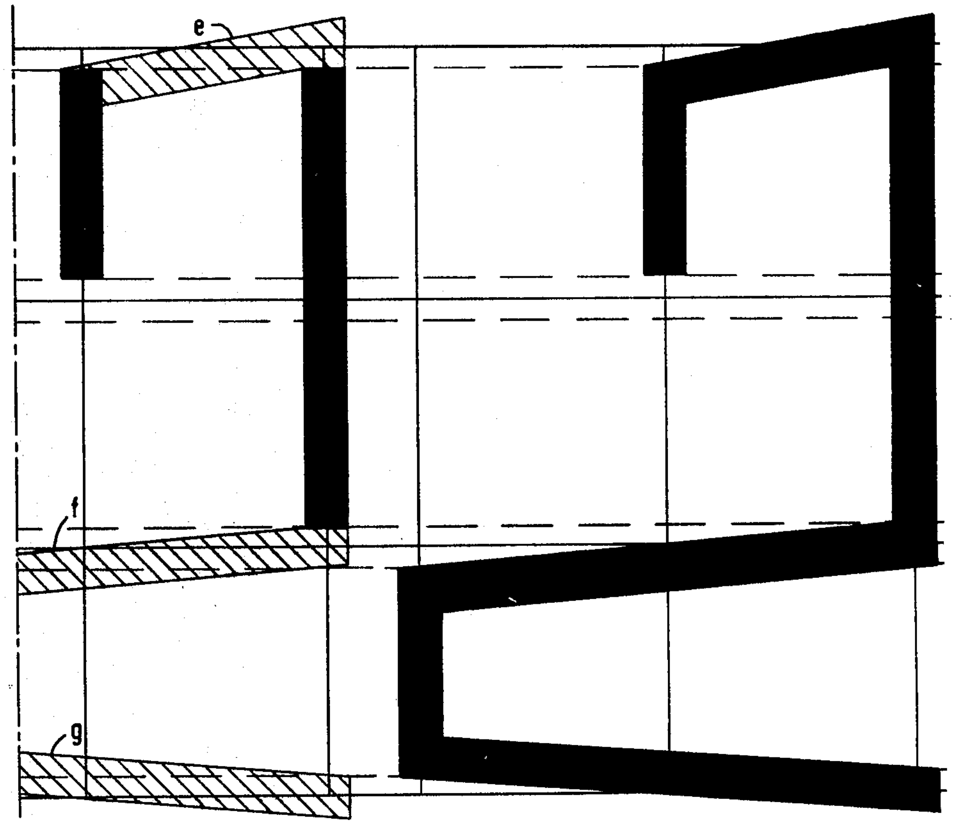

In FIG. 3 (left) the four sections of line for the code elements are shown in the columns A, B and C and the rows D, E and F. The crosses "X" at the left edge of FIG. 3*a* indicate the location of one column of the three sets of photocells for scanning at the normal heights. The "X" of photocells F*a*, F*a'*, F*a''* top crosses of each section or row belonging to one set, just as is the case with the middle crosses "X" of photocells F*b*, F*b'*, F*b''* and the bottom crosses "X" of photocells F*c*, F*c'*, F*c''* belong to two other sets. Instead of the lengths *p, q* and *r* the shortened lengths *p', q'* and *r'* are dealt with. Of course two successive sections of line remain united, as shown in column C. In the formation of the figure or digit "2," it must be seen also that the hatched or blackened sections of line drawn between the columns mostly shown in FIG. 3*b* for the sake of the visual legibility do not influence the scanning result. As soon as the column of the signal faces the columns of photocells, as the character is shifted horizontally from right to left, the scanning results of all those photocells F*a* through F*c''* are recorded. As these photocells, provided with alternating voltage amplifiers, only detect a sharp transition occuring at this moment, the slanting sections of line *e, f* and *g*, indicated by hatching in FIG. 3*b*, will not influence the scanning result with the given direction of movement. In the case of the figure or digit character "2" shown in the right-hand part of FIG. 3*b* the photocells will only record the vertical blackened sections of line shown in the left-hand part of FIG. 3*a* in columns A, B and C.

Figure 4A:
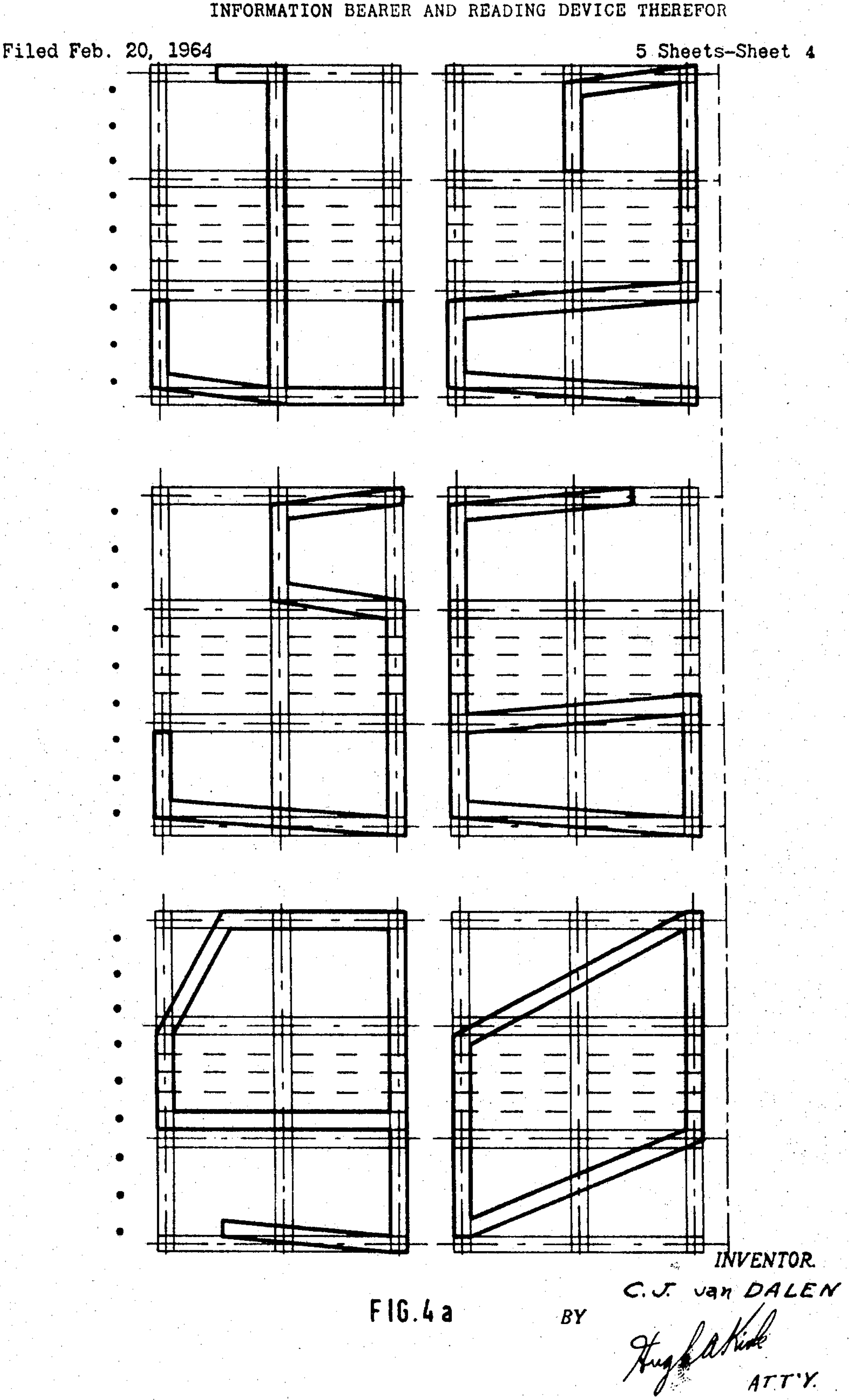
FIGS. 4*a* and 4*b* taken together show the formation of all the digits according to one embodiment of this invention including that of the figure "2" shown in FIG. 3*b*.
Figure 4B:
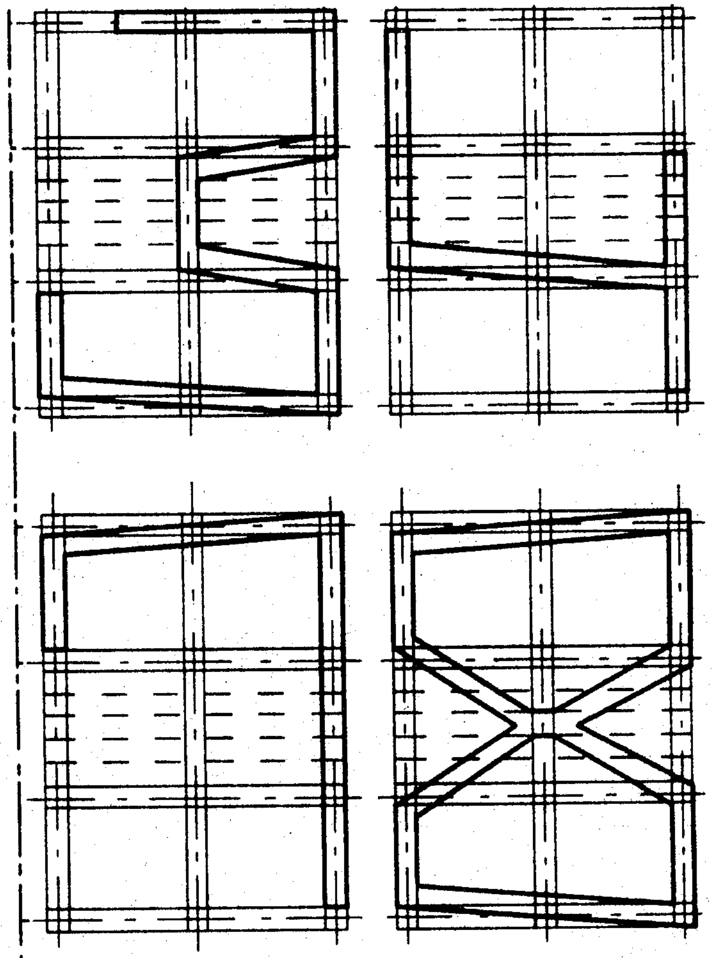

All the figures or digits "0" through "9" shown in FIGS. 4*a* and 4*b* taken together have been formed in this manner with 4M–5S self-checking constant ratio of mark and space code elements, except for figure "1" which has a 5M–4S or reverse constant ratio. Of course one is at liberty to admit sudden additional transitions of blank to line, as has been done with the figures 3 and 9, if they fall outside the recording moment, i.e. outside the three columns.

(B) The reader

Figure 5:
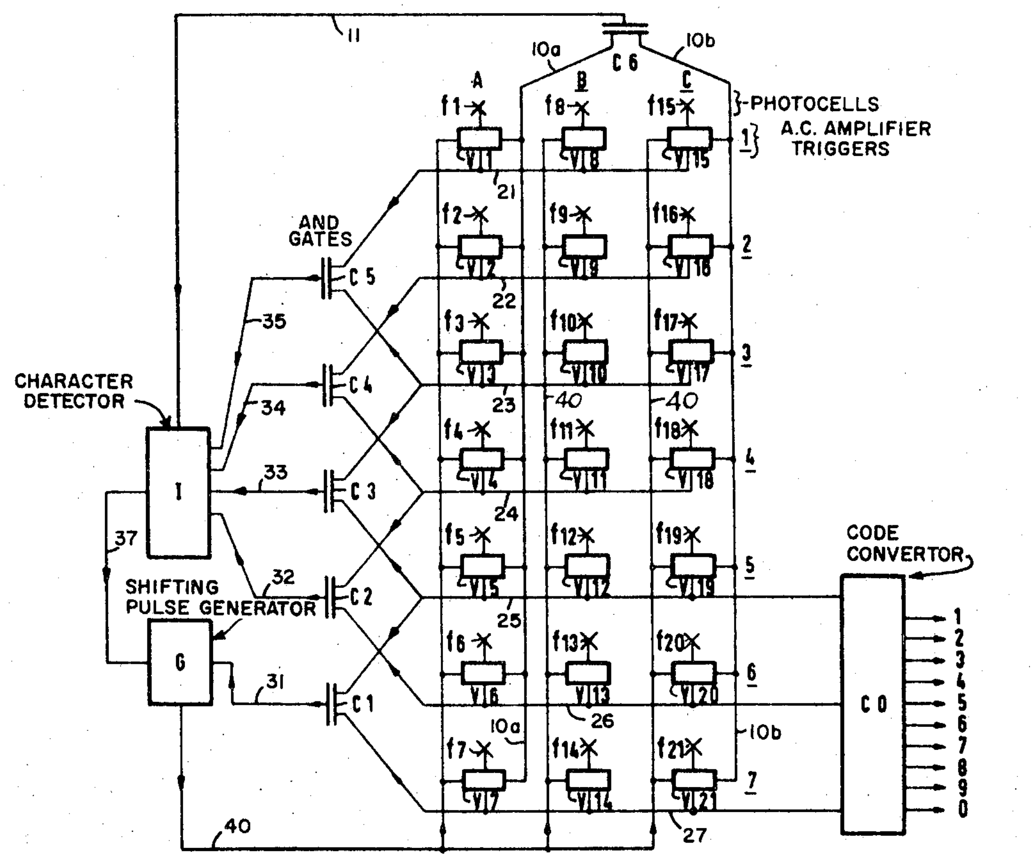
FIG. 5 is a schematic block wiring diagram of an embodiment of a reading device for the characters shown in FIGS. 3 and 4.

A block wiring diagram of an embodiment of a reader or scanning device presenting a suitable tolerance in the direction of the columns is shown in FIG. 5. The device contains three columns of photocells, namely *f*1–*f*7; *f*8–*f*14 and *f*15–*f*21. There is one photocell for each section to be scanned. The rectangles V1–V7; V8–V14 and V15–V21 represent the A.C. amplifiers and triggers associated with the photocells. The triggers indicate by their states whether the corresponding photocells have or have not observed blackened sections of line or code elements. Further the circuit contains AND gates $C_1$ through $C_6$, a trigger-indicator I, a generator G, and a code converter CO.

So there are seven rows 1 through 7 of three photocells. When in the normal case the character lies under the rows 3, 4 and 5, the device will still read it, if it is shifted upwards or downwards over a distance of ⅔ of the height of the character or signal. This tolerance will amply do. A larger vertical misalignment tolerance is of no use, because then the cells will generally pass over the adjacent row or line of characters above or below the row of characters being read. As has been observed already, the scanning is effected at the moment when the columns of a character are facing the columns of the photocells. To find out when this is the case it is necessary that in two specified columns the characters contain sections of line as code elements. In the example given in FIGS. 3 and 4, these two columns are the two outer ones. Thus, if at least one section of line is observed in column A as well as in column C, the character is in the correct horizontal position under the photocell of the scanner and this is established by the AND-gate C6, which then is open transmitting a potential from conductors 10*a* and 10*b* via conductor 11 to the character detector I.

Now it must still be found out under which rows 1 through 7 of photocells this detected character lies. Therefore the characters are so formed that they contain sections of line as code elements in two specified rows also.

In the example given in FIGS. 3 and 4, these two rows are the top and the bottom ones. If now at least one section of line is observed in the row 1 as well as in the row 3, the character lies under rows 1, 2 and 3, and this is established because the AND-gate C5 opens from the conductors 21 and 23 to detector I via conductor 35. Similarly the AND-gate C4 will open via conductors 22 and 24, if the character faces the rows 2, 3 and 4, and similarly the AND-gates C3, C2 and C1 will open, if the character faces the rows 3, 4 and 5, the rows 4, 5 and 6 and the rows 5, 6 and 7, respectively. The above-mentioned requirements apply to the shape of all the digits or characters shown in FIGS. 3 and 4.

The columns of A.C. amplifiers and triggers V1 through V7, V8 through V14, and V15 through V21, corresponding respectively to the columns A, B and C of elements of each character as shown in FIG. 3*a*, are arranged as shift registers, so that the states of the triggers in each column can be shifted from above to below in that column. If for example, the AND-gates C6 and C4 open, this means that the character has been scanned to initiate its corresponding element triggers in rows 2, 3 and 4; their states must be shifted to the rows 5, 6 and 7, which are the only rows of triggers connected to the code converter CO via conductors 25, 26 and 27, and which converter can deliver the decoded character. Because the AND-gate C6 and one of the AND-gates C2–C5 are open, the character detector or trigger-indicator I operates, thus starting the shifting pulse generator G via conductor 37 which effects the shifting of the trigger states in the columns A, B and C via conductor 40, until the AND-gate C1 opens, due to which the generator G is stopped. This is when the states of the rows of triggers have been shifted to the rows 5, 6 and 7 connected to the code converter CO to deliver the information of the scanned character. If the character is opposite the rows 5, 6 and 7 when first scanned, the AND-gate C1 will open at once, thus preventing the start of the generator G. Because of this shifting, only one code converter is necessary in the circuit regardless of the vertical misalignment of the character scanned.

The reading device can be extended by using three interspersed sets of photocells, as has already been described above at the left of FIG. 3*a*, by an apparatus also described in the above mentioned copending U.S. patent specification Serial No. 72,666. If the present reader were adapted for three sets of interspersed photocells for each character according to this copending application, there would be again one AND-gate C6 but there would be three times as many AND-gate C1 through C5, but the trigger states would still be shifted according to where the top and the bottom sections of line are found, the three rows of one set shifting by one row every time, until the set connected to the code converter CO is reached again. Now, of course, the character may be correctly read by more than one set of cells, but there is no difficulty about that, because of the shortened sections of line, the code converter can never deliver an incorrect reading result.

While I have illustrated and described what I regard to be the preferred embodiment of my invention, nevertheless it will be understood that such is merely exemplary and that numerous modifications and rearrangements may be made therein, without departing from the essence of the invention.

What is claimed is:

1. An information bearer marked with at least one row of code element characters that can be read both visually and by a machine which machine comprises:
   (a) a greater plurality of photocell scanners (*f*1–*f*21) than elements (*m*X*n*) in any character,
   (b) storing devices (V1–V21) responsive only to abrupt changes in characters on said bearer as it moves along said row of characters relative to said bearer,
   (c) means (C1–C6, I) for detecting a whole character adjacent said scanners,
   (d) an output (C*o*) connected to one set of said scanners corresponding to all of the elements in any one character, and
   (e) means (G) responsive to said detecting means for shifting information in said scanners to those scanners corresponding to the number of elements in a character connected to said output,
   said character comprising:
      (1) *m* columns of vertical code element sections,
      (2) *n* rows of vertical code element sections,
      (3) said code elements being of different length than 1/*n* of the column's height,
      (4) sections transversely connecting at least one vertical code element section in one column to make said code elements visually readable, said transverse sections being so located that said scanners reject them, and
      (5) a constant-ratio of marking elements to space elements in said characters to form a self-checking code.

2. An information bearer according to claim 1 wherein the height of at least one of said element sections is less than 1/*n* said column height.

3. An information bearer according to claim 1 wherein the height of at least one of said element sections is greater than 1/*n* of said column height.

4. A reader for a row of characters on an information bearer wherein each said character comprises:
   (a) *m* columns of vertical code element sections,
   (b) *n* rows of vertical code element sections,
   (c) said code element sections being of different height than 1/*n* of the column height of said characters,
   (d) transverse sections connected to at least one vertical code element section in each column having such a code element, for making that character also visually readable, but located so as to be rejected by said reader for said code element sections, and
   (e) a constant-ratio of mark code elements to space code elements;
   said reader comprising:
      (1) at least one set of scanners (*f*1–*f*21) for each element section of any character, said set being arranged in *m* columns and more than *n* rows to allow for vertical misalignment of said rows of characters relative to said scanners,
      (2) means (V1–V21) connected to said scanners for causing said reader to respond only to abrupt transitions for code elements in said columns, and for storing said abrupt transitions,
      (3) output means (CO) connected to *n* adjacent rows of said storing means,
      (4) means (I) connected by said scanners for detecting the presence of a whole character within said columns and said rows, and
      (5) means (G) responsive to said detecting means for stepping the stored abrupt transitions in said character energized storing means along said columns into said rows connected to said output means when the character energized storing means are other than those connected to said output means.

5. A reader according to claim 4 wherein said scanners include photocells.

6. A reader according to claim 4 wherein said output means comprises a code converter circuit.

7. A reader according to claim 4 wherein said detecting means includes AND-gates.

8. A reader according to claim 4 wherein said stepping means comprises a shift-pulse generator.

9. A reader according to claim 4 wherein said storing means are arranged in columns according to a shift register to be operated by the pulses generated from said stepping means.

10. A reader according to claim 4 wherein said means for causing said reader to respond only to abrupt transitions comprises A.C. amplifiers for said scanners.

11. A reader according to claim 4 wherein said detecting means detects code element sections in two predetermined columns and two predetermined rows of each character.

12. A reader according to claim 11 wherein said two predetermined columns and said two predetermined rows are the outside columns and rows of each character.

13. A reader according to claim 4 including a plurality of sets of said photocells for each character wherein each set comprises correspondingly located photocells in each element section.

References Cited

UNITED STATES PATENTS

| | | | |
|---|---|---|---|
| 3,173,126 | 3/1965 | Rabinow et al. ---- | 340—146.3 |
| 3,229,252 | 1/1966 | Reumerman et al. -- | 340—146.3 |

MAYNARD R. WILBUR, Primary Examiner

R. F. GNUSE, Assistant Examiner

U.S. Cl. X.R.

235—61.11

PO-1050
(5/69)

UNITED STATES PATENT OFFICE
CERTIFICATE OF CORRECTION

Patent No. 3,469,237 Dated Sept. 23, 1969

Inventor(s) C. J. VAN DALEN

It is certified that error appears in the above-identified patent and that said Letters Patent are hereby corrected as shown below:

Column 4, line 4, after "The", second occurrence, insert -- top crosses --; line 5, cancel "top crosses"; line 9, after "r" insert -- for the code elements -- ; line 68, "photocell" should read -- photocells -- .

SIGNED AND
SEALED
JAN 6 - 1970

(SEAL)
Attest:

Edward M. Fletcher, Jr.
Attesting Officer

WILLIAM E. SCHUYLER, JR.
Commissioner of Patents